United States Patent
Hu

(10) Patent No.: US 12,323,569 B2
(45) Date of Patent: Jun. 3, 2025

(54) METHOD AND APPARATUS FOR PROCESSING MULTI-VIEW VIDEO WITH REGION INFORMATION FROM VIEW GROUP

(71) Applicant: Tencent Technology (Shenzhen) Company Limited, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 255 days.

(21) Appl. No.: 17/988,712

(22) Filed: Nov. 16, 2022

(65) Prior Publication Data
US 2023/0086988 A1    Mar. 23, 2023

Related U.S. Application Data

(63) Continuation of application No. PCT/CN2022/075779, filed on Feb. 10, 2022.

(30) Foreign Application Priority Data

Mar. 15, 2021    (CN) .......................... 202110277836.6

(51) Int. Cl.
*H04N 13/194*    (2018.01)
*H04N 13/161*    (2018.01)
(Continued)

(52) U.S. Cl.
CPC ......... *H04N 13/194* (2018.05); *H04N 13/161* (2018.05); *H04N 13/172* (2018.05);
(Continued)

(58) Field of Classification Search
CPC .. H04N 13/194; H04N 13/161; H04N 13/172; H04N 13/271; H04N 19/167;
(Continued)

(56) References Cited

U.S. PATENT DOCUMENTS

2019/0320164 A1\* 10/2019 Salahieh .............. H04N 13/156
2020/0014907 A1\*  1/2020 Lee ........................ H04N 21/84
(Continued)

FOREIGN PATENT DOCUMENTS

| CN | 101472190 A | 7/2009 |
| CN | 101540652 A | 9/2009 |

(Continued)

OTHER PUBLICATIONS

Tencent Technology (Shenzhen) Company Limited, WO, PCT/CN2022/075779, Apr. 24, 2022, 5 pgs.
(Continued)

*Primary Examiner* — Richard T Torrente
(74) *Attorney, Agent, or Firm* — Morgan, Lewis & Bockius LLP

(57) ABSTRACT

A computer device acquires multi-view video data that includes video data of multiple views. The computer device performs view group division on the multi-view video data based on the multiple views to obtain at least one view group. The computer device determines first spatial region information of the at least one view group. The first spatial region information includes information of a three-dimensional spatial region where the at least one view group is located. The computer device encapsulates the multi-view video data and the first spatial region information.

17 Claims, 7 Drawing Sheets

(51) Int. Cl.
  *H04N 13/172* (2018.01)
  *H04N 21/81* (2011.01)
  *G06T 15/08* (2011.01)
  *H04N 21/236* (2011.01)
(52) U.S. Cl.
  CPC .......... *H04N 21/816* (2013.01); *G06T 15/08* (2013.01); *H04N 21/236* (2013.01)
(58) Field of Classification Search
  CPC ...... H04N 19/17; H04N 19/46; H04N 19/597; H04N 19/70; H04N 13/282; G06T 9/001
  See application file for complete search history.

(56) References Cited

U.S. PATENT DOCUMENTS

| | | | |
|---|---|---|---|
| 2020/0296397 A1 | 9/2020 | Wang et al. | |
| 2022/0360819 A1* | 11/2022 | Huang | H04N 19/597 |

FOREIGN PATENT DOCUMENTS

| | | |
|---|---|---|
| CN | 102595111 A | 7/2012 |
| CN | 106293043 A | 1/2017 |
| CN | 107888939 A | 4/2018 |
| CN | 110798707 A | 2/2020 |
| CN | 111669518 A | 9/2020 |
| CN | 111866525 A | 10/2020 |
| CN | 112492289 A | 3/2021 |
| EP | 2637416 A1 | 9/2013 |

OTHER PUBLICATIONS

Tencent Technology (Shenzhen) Company Limited, IPRP, PCT/CN2022/075779, Sep. 12, 2023, 6 pgs.

Tencent Technology, ISR, PCT/CN2022/075779, Apr. 24, 2022, 3 pgs.

\* cited by examiner

METHOD AND APPARATUS FOR PROCESSING MULTI-VIEW VIDEO WITH REGION INFORMATION FROM VIEW GROUP

CROSS-REFERENCE TO RELATED APPLICATIONS

This application is a continuation application of PCT Patent Application No. PCT/CN2022/075779, entitled "METHOD AND APPARATUS FOR PROCESSING MULTI-VIEWING-ANGLE VIDEO, AND DEVICE AND STORAGE MEDIUM" filed on Feb. 10, 2022, which claims priority to Chinese Patent Application No. 202110277836.6, filed with the State Intellectual Property Office of the People's Republic of China on Mar. 15, 2021, and entitled "METHOD AND APPARATUS FOR PROCESSING MULTI-VIEW VIDEO, DEVICE AND STORAGE MEDIUM", all of which are incorporated herein by reference in their entirety.

FIELD OF THE TECHNOLOGY

Embodiment of this application relates to the technical field of video processing, and in particular to the processing of a multi-view video.

BACKGROUND OF THE DISCLOSURE

Immersive media refers to media content that can bring consumers an immersive experience. Immersive media can be divided into 3 Degrees of Freedom (3DoF) media, 3DoF+ media and 6DoF media according to the DoF when users consume media content. The common 6DoF media include multi-view videos and point cloud media.

For the multi-view videos, one view group is usually used for consumption. However, when a multi-view video corresponds to a plurality of view groups, how to efficiently transmit video resources is a technical problem that needs to be solved at present.

SUMMARY

In view of this, this application provides a method and apparatus for processing a multi-view data, a device and a storage medium, so as to enable users to quickly select appropriate view groups and improve the processing efficiency and user experience of multi-view videos.

In one aspect, an embodiment of this application provides a method for processing a multi-view video, applied to a first computer device. The method includes: acquiring multi-view video data, the multi-view video data including video data of a plurality of views; performing view group division on the multi-view video data based on the views to obtain at least one view group; determining first spatial region information of the at least one view group, the first spatial region information including information of a three-dimensional spatial region where the view group is located; and encapsulating the multi-view video data and the first spatial region information.

In another aspect, an embodiment of this application provides a method for processing a multi-view video, applied to a second computer device which can be understood as a video playing device. The method includes: receiving first spatial region information of at least one view group transmitted by a first computer device, the at least one view group being obtained by performing view group division on the multi-view video data based on views, the multi-view video data including video data of a plurality of views, the first spatial region information including information of a three-dimensional spatial region where the view group is located; transmitting request information to the first device according to the first spatial region information, the request information being used for requesting a media resource corresponding to a target view group in the at least one view group; receiving the media resource corresponding to the target view group transmitted by the first computer device according to the request information; and playing a video corresponding to the target view group according to the media resource corresponding to the target view group.

In another aspect, an embodiment of this application provides an apparatus for processing multi-view video data, including:
a processing unit configured to acquire multi-view video data, the multi-view video data including video data of a plurality of views; perform view group division on the multi-view video data based on the views to obtain at least one view group; and determine first spatial region information of the at least one view group, the first spatial region information including information of a three-dimensional spatial region where the view group is located; and
an encapsulation unit configured to encapsulate the multi-view video data and the first spatial region information.

In another aspect, an embodiment of this application provides an apparatus for processing multi-view video data, including:
a receiving unit configured to receive first spatial region information of at least one view group transmitted by a first device, the at least one view group being obtained by performing view group division on the multi-view video data based on views, the multi-view video data including video data of a plurality of views, the first spatial region information including information of a three-dimensional spatial region where the view group is located;
a transmitting unit configured to transmit request information to the first device according to the first spatial region information, the request information being used for requesting a media resource corresponding to a target view group in the at least one view group,
the receiving unit being further configured to receive the media resource corresponding to the target view group transmitted by the first device according to the request information; and
a processing unit configured to play a video corresponding to the target view group according to the media resource corresponding to the target view group.

In another aspect, the embodiments of this application provide a computing device, including: a processor and a memory. The memory is configured to store a computer program, and the processor is configured to invoke and run the computer program stored in the memory to perform the method according to the foregoing aspects.

In another aspect, an embodiment of this application provides a non-transitory computer-readable storage medium, configured to store a computer program, the computer program causing the computer to perform the method according to the foregoing aspects.

In another aspect, an embodiment of this application provides a computer program product including instructions. The computer program product, when executed by a computer, cause the computer to perform the method in the foregoing aspects.

To sum up, in this application, first spatial region information of at least one view group is transmitted to the second device through the first device, so that the second device accurately and quickly selects the target view group for watching from the at least one view group according to the first spatial region information. After acquiring request information for the target view group, the first device can transmit only a media resource corresponding to the target view group to the second device, without transmitting all media resources corresponding to multi-view video data to the second device, thus improving the transmission efficiency of media resources, enabling the second device to quickly acquire the media resource actually needed for watching, and improving the transmission efficiency of media resources in a multi-view video data scenario.

DESCRIPTION OF EMBODIMENTS

Figure 1:
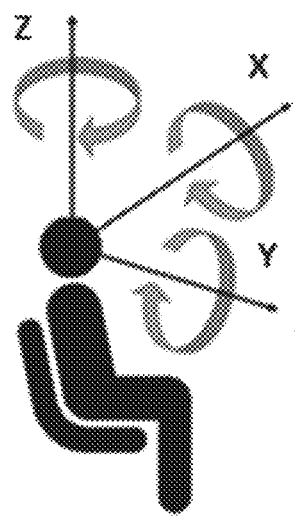
FIG. 1 schematically illustrates a schematic diagram of 3 Degrees of Freedom (3DoF).

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

It is to be noted that in the specification, claims, and accompanying drawings of this application, the terms "first", "second", and so on are intended to distinguish between similar objects but do not necessarily indicate a specific order or sequence. It should be understood that the data so used may be interchanged in an appropriate condition, so that the embodiments of this application described herein can be implemented in an order other than those illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

Before introducing the technical solution of this application, the relevant knowledge of this application will be introduced first below.

Point cloud: point cloud is a set of randomly distributed discrete points in space, representing the spatial structures and surface attributes of three-dimensional objects or scenes. Point cloud refers to the geometry of massive three-dimensional points. Each point in the point cloud has at least three-dimensional position information, and may also have additional attributes such as hue (color), material, or other information such as reflectivity, depending on the different application scenes. In general, each point in point cloud has the same number of additional attributes. For example, point cloud obtained according to the principle of laser measurement, includes three-dimensional coordinates (XYZ) and laser reflectance. Point cloud obtained according to the principle of photogrammetry includes three-dimensional coordinates (XYZ) and color information (RGB, red green blue). Point cloud obtained by combining the principles of laser measurement and photogrammetry includes three-dimensional coordinates (XYZ), laser reflectance and color information (RGB).

Means to acquire point cloud data may include, but not limited to, at least one of the following: (1) Generation by computer device. A computer device may generate point cloud data according to virtual three-dimensional objects and virtual three-dimensional scenes. (2) Acquisition through three-dimension (3D) laser scanning. Through 3D laser scanning, point cloud data of three-dimensional objects or three-dimensional scenes in a static real world can be acquired, and millions of point cloud data can be obtained every second. (3) Acquisition through 3D photogrammetry. Point cloud data of visual scenes of a real world can be acquired by acquiring the visual scenes of the real world through 3D photography devices (that is, a group of cameras or a camera device with a plurality of lenses and sensors). Point cloud data of three-dimensional objects or three-dimensional scenes in a dynamic real world can be obtained through 3D photography. (4) Acquisition of point cloud data of biological tissues and organs through medical devices. In the medical field, point cloud data of biological tissues and organs can be acquired through medical devices such as Magnetic Resonance Imaging (MRI), Computed Tomography (CT), and electromagnetic positioning information.

According to the use of point cloud, point cloud can be divided into two categories, including machine-perception point cloud, which, for example, can be used in autonomous navigation systems, real-time inspection systems, geographic information systems, visual sorting robots, rescue robots and other scenes, and eye-perception point cloud, which, for example, can be used in digital cultural heritage, free-view broadcasting, three-dimensional immersive communication, three-dimensional immersive interaction and other point cloud application scenarios.

Point cloud can be classified according to acquisition approaches, including first-category static point cloud, that is, both the object and the device for acquiring the point cloud are static; second-category dynamic cloud, that is, the object is moving but the device for acquiring the point cloud is static; and third-category dynamically acquired point cloud, that is, the device for acquiring the point cloud is moving.

PCC: Point Cloud Compression. Point cloud is a set of massive points. Storing point cloud data will not only consume a lot of internal memory, but also is not conducive to transmission. There is no such large bandwidth in related technologies that can support direct transmission of point cloud on a network layer without compression. Therefore, it is necessary to compress point cloud.

G-PCC: Geometry-based Point Cloud Compression. G-PCC compresses the first-category static point cloud and the third-category dynamically acquired point cloud. The corresponding point cloud media obtained can be called the point cloud media that is compressed based on geometry, or G-PCC point cloud media for short.

V-PCC: Video-based Point Cloud Compression. V-PCC compresses the second-category dynamic point cloud. The corresponding point cloud media obtained can be called the point cloud media that is compressed based on the traditional video coding modes, or V-PCC point cloud media for short.

Sample: A sample is an encapsulation unit in a media file encapsulation process. A media file is formed by a plurality of samples. Taking that the media file is video media as an example, a sample of the video media is usually a video frame.

DoF: Degree of Freedom. In a mechanical system, it refers to the number of independent coordinates. In addition to the degree of freedom of translation, there are also degrees of freedom of rotation and vibration. In the embodiments of this application, it refers to the degree of freedom that supports movement and generates content interaction when a user watches immersive media.

3DoF: three degrees of freedom. It refers to three degrees of freedom of rotation of user heads around XYZ axes. FIG. 1 schematically illustrates a schematic diagram of 3DoF. Referring to FIG. 1, the user can rotate his head around three axes at a certain place or point, including turning around, heading up and down, and shaking. Through the experience of 3DoF, the user can immerse in a scene 360 degrees. When it is static, it may be understood as a panoramic picture. When a panoramic picture is dynamic, it is a panoramic video, that is, VR video. However, the VR video has certain limitations. Users cannot move and choose any place to watch it.

Figure 2:
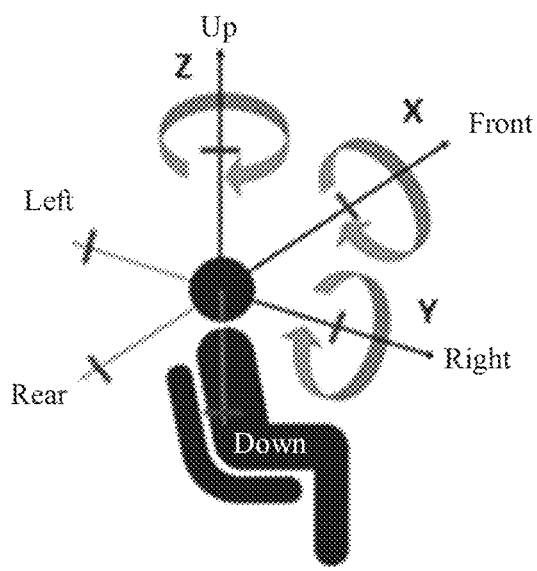
FIG. 2 schematically illustrates a schematic diagram of 3DoF+.

3DoF+: it refers to that, based on 3DoF, users also have degrees of freedom to move restrictedly along XYZ axes, which may also be called restricted 6DoF, and corresponding media stream may be called restricted 6DoF media stream. FIG. 2 schematically illustrates a schematic diagram of 3DoF+.

Figure 3:
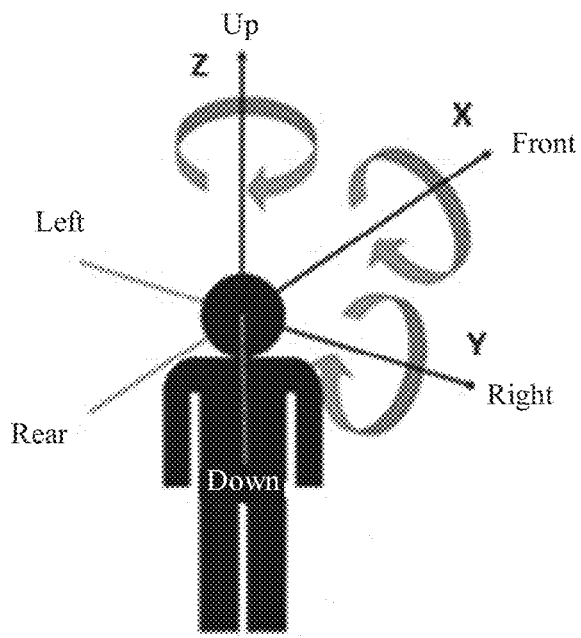
FIG. 3 schematically illustrates a schematic diagram of 6DoF.

6DoF: it refers to that, based on 3DoF, users also have degrees of freedom to move freely along XYZ axes, and corresponding media stream may be called 6DoF media stream. FIG. 3 schematically illustrates a schematic diagram of 6DoF. 6DoF media refers to 6DoF video, which can provide users with a high-DoF watching experience of freely moving the view in XYZ axes of a three-dimensional space and freely rotating the view around XYZ axes. 6DoF media is a combination of videos acquired by camera arrays from different views in a space. In order to facilitate the expression, storage, compression and processing of 6DoF media, 6DoF media data is expressed as a combination of the following information: texture maps acquired by a plurality of cameras, depth maps corresponding to the texture maps acquired by the plurality of cameras, and corresponding 6DoF media content description metadata. The metadata includes parameters of the plurality of cameras, as well as description information of stitching layout and edge protection of 6DoF media, for example. At a coding end, texture map information of the plurality of cameras and corresponding depth map information are stitched, and the description data of a stitching method is written into metadata according to the defined syntax and semantics. The stitched depth map and texture map information of the plurality of cameras is coded through plane video compression, and transmitted to a terminal for decoding. After decoding, the synthesis of 6DoF virtual views requested by the user is performed to provide the user the experience of watching 6DoF media.

Point cloud media refers to a point cloud media file formed by point cloud data. Point cloud media includes a plurality of media frames. Each media frame in point cloud media is composed of point cloud data. Point cloud media can flexibly and conveniently express spatial structures and surface attributes of three-dimensional objects or three-dimensional scenes, so it is widely used in Virtual Reality (VR) games, Computer Aided Design (CAD), Geographic Information System (GIS), Automatic Navigation System (ANS), digital cultural heritage, free-view broadcasting, three-dimensional immersive remote presentation, three-dimensional reconstruction of biological tissues and organs and other projects.

Immersive media refers to media content that can bring consumers an immersive experience. Immersive media can be divided into 3DoF media, 3DoF+ media and 6DoF media according to the DoF when users consume media content. The common 6DoF media include multi-view videos and point cloud media.

Multi-view video is usually shot from a plurality of angles by camera arrays to form texture information (color information, etc.) and depth information (spatial distance information, etc.) of the scene, and forms 6DoF media that can be consumed on a user side in combination with mapping information from 2D plane frames to 3D presentation spaces.

Volumetric media: it is one kind of immersive media. For example, it may include volumetric videos. Volumetric video is three-dimensional data representation. Since the current mainstream coding is based on two-dimension video data, the original volumetric video data needs to be converted from three-dimension to two-dimension before processing such as encapsulation and transmission at the system layer. In the process of content presentation of volumetric video, it is necessary to convert data of two-dimensional representation into three-dimensional data to represent the volumetric video presented finally. How the volumetric video is represented on a two-dimension plane will directly affect the encapsulation and transmission at a system layer, and final content presentation of the volumetric video.

Atlas: it is used for indicating region information on 2-dimension (2D) plane frames, region information of 3-dimension (3D) presentation spaces, a mapping relationship between the two and necessary parameter information for mapping. An atlas includes a set of patches and associated information of a region in the three-dimensional space of volumetric data corresponding to the patch. The patch is a rectangular region in the atlas, which is associated with the volumetric information of the three-dimensional space. Component data of two-dimensional representation of the volumetric video are processed to generate a patch. According to the position of the volumetric video represented in geometry component data, the two-dimension plane region where the two-dimensional representation of the volumetric video is located is divided into several rectangular regions of different sizes. One rectangular region is one patch. The patch contains necessary information to back project the rectangular region to the three-dimensional space. The patches are packaged to generate an atlas. Each patch is put into a two-dimensional grid. It is ensured that effective parts of the patches are not overlapped. The patches generated by one volumetric video may be packaged into one or more atlases. Based on atlas data, corresponding geometry data, attribute data and placeholder data are generated, and the atlas data, geometry data, attribute data and placeholder data are combined to form the final representation of the volumetric video in the two-dimension plane. Geometry components are mandatory, placeholder components are conditionally mandatory, and attribute components are optional.

AVS: Audio Video Coding Standard.

ISOBMFF: ISO Based Media File Format, which refers to media file format based on International Standard Organization (ISO). ISOBMFF is the encapsulation standard for media files. The most typical ISOBMFF file is the Moving Picture Experts Group 4 (MP4) file.

Depth map: As a three-dimensional scene information representation mode, the gray value of each pixel in the depth map can be used for representing the distance between a point and a camera in the scene.

HEVC: High Efficiency Video Coding, international video coding standard HEVC/H.265.

VVC: Versatile Video Coding, international video coding standard VVC/H.266.

SCC: Screen Content Coding.

The processing framework of point cloud media will be introduced below.

Figure 4:
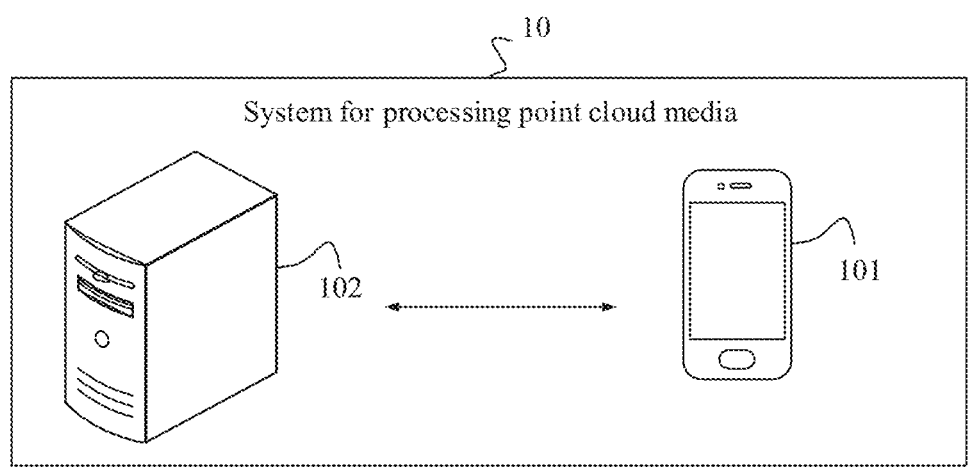
FIG. 4 illustrates a schematic architectural diagram of a system for processing point cloud media according to an exemplary embodiment of this application.

FIG. 4 illustrates a schematic architectural diagram of a system for processing point cloud media according to an exemplary embodiment of this application. The system 10 for processing point cloud media includes a video playing device 101 and a video production device 102.

The video production device 102 refers to a computer device used by a provider of point cloud media (such as a content producer of point cloud media). The computer device may be a terminal (such as a Personal Computer (PC), a smart mobile device (such as a smart phone), a server, etc.

The video playing device 101 refers to a computer device used by a user (such as a subscriber) of point cloud media. The computer device may be a terminal (such as a PC), a smart mobile device (such as a smart phone), a VR device (such as a VR helmet, VR glasses), etc.

A transmission process of point cloud media is involved between the video production device 102 and the video playing device 101. The transmission process may be performed based on various transmission protocols. The transmission protocols here may include, but not limited to: Dynamic Adaptive Streaming over HTTP (DASH) protocol, HTTP Live Streaming (HLS) protocol, Smart Media Transport Protocol (SMTP), Transmission Control Protocol (TCP), etc.

Figure 5A:
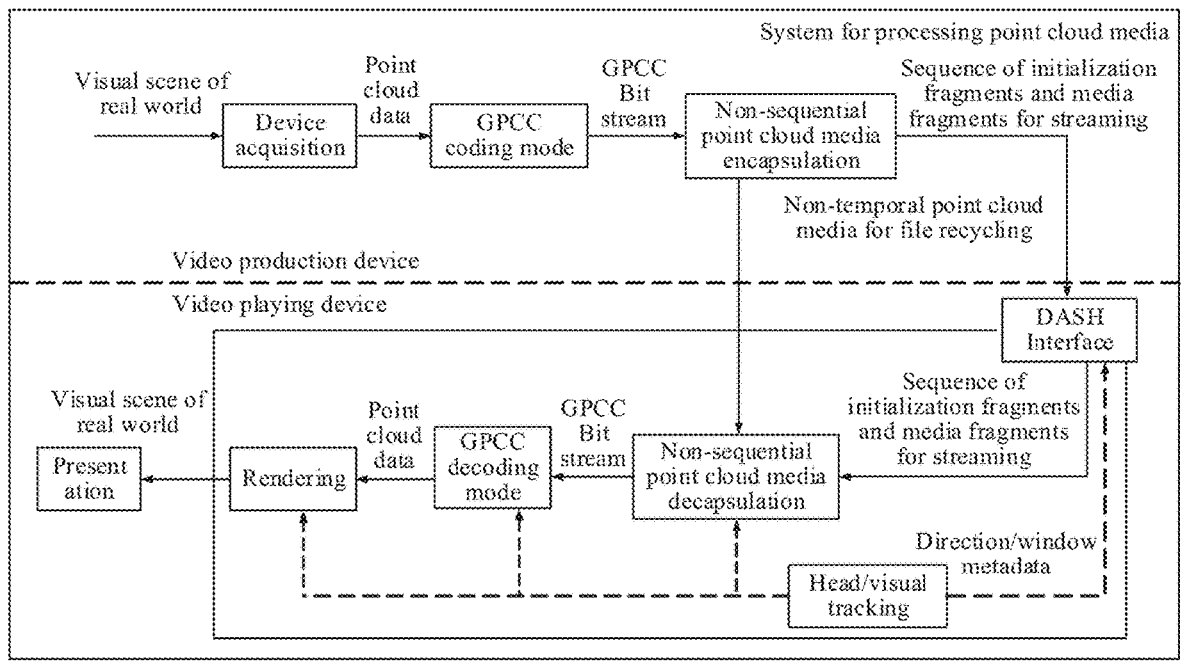
FIG. 5A illustrates a schematic architectural diagram of an architecture for processing point cloud media according to an exemplary embodiment of this application.

FIG. 5A illustrates a schematic architectural diagram of an architecture for processing point cloud media according to an exemplary embodiment of this application. In combination with the system for processing point cloud media in FIG. 4 and the architecture for processing point cloud media in FIG. 5A, the scheme for processing point cloud media provided by the embodiments of this application will be introduced below. The processing process of point cloud media includes a processing process on a video production device side and a processing process on a video playing device side. The specific processing process is as follows:

I. Processing Process on Video Production Device Side (1) Acquisition Process of Point Cloud Data In an implementation, from the perspective of an acquisition method of point cloud data, point cloud data may be acquired by two means, that is, capturing a visual scene of a real world with a capture device, and generating point cloud data with a computer device. In an implementation, the capture device may be a hardware component set in the video production device. For example, the capture device is a camera, a sensor, and the like of a terminal. The capture device may also be a hardware device connected to a content production device, such as a camera connected to a server. The capture device is configured to provide point cloud data acquisition services for the video production device. The capture device may include, but not limited to, any one of an image pickup device, a sensing device and/or a scanning device. The image pickup device may include an ordinary camera, a stereo camera, and/or a light field camera, etc. The sensing device may include a laser device, a radar device, etc. The scanning device may include a 3D laser scanning device, etc. There may be a plurality of the capture devices. These capture devices are deployed in some specific locations in the real space to capture point cloud data from different angles in the space at the same time. The captured point cloud data is synchronized in time and space. That is, the corresponding point cloud data is obtained by acquiring the visual scene of the real world through devices. In another implementation, the computer device may generate point cloud data according to virtual three-dimensional objects and virtual three-dimensional scenes. Due to different acquisition methods of point cloud data, compression coding methods corresponding to the point cloud data acquired by adopting different methods may also be different.

(2) Coding and encapsulation processes of point cloud data

In an implementation, the video production device adopts a Geometry-Based Point Cloud Compression (GPCC) coding method or a Video-Based Point Cloud Compression (VPCC) coding method to code the obtained point cloud data and obtain the GPCC bit stream or VPCC bit stream of the point cloud data.

Figure 5B:
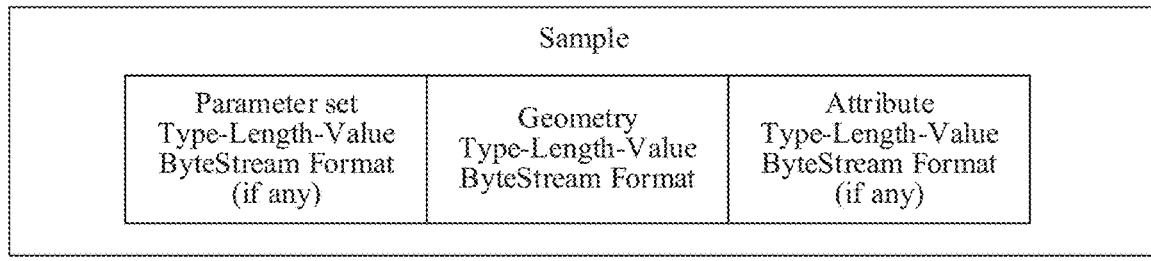
FIG. 5B illustrates a schematic structural diagram of a sample according to an exemplary embodiment of this application.

Taking the GPCC coding method as an example, the video production device adopts a file track to encapsulate the GPCC bit stream of the coded point cloud data. The so-called file track refers to an encapsulation container of the GPCC bit stream of the coded point cloud data. The GPCC bit stream may be subjected to non-sequential point cloud media encapsulation. For example, the GPCC bit stream may be encapsulated in a single file track or a plurality of file tracks. The specific situations that the GPCC bit stream is encapsulated in a single file track and the GPCC bit stream is encapsulated in a plurality of file tracks are as follows:

1. The GPCC bit stream is encapsulated in a single file track. When the GPCC bit stream is transmitted in a single file track, the GPCC bit stream is required to be declared and represented according to the transmission rules of single file track. The GPCC bit stream encapsulated in a single file track needs no further processing. It may be encapsulated through the International Standard Organization Based Media File Format (ISOBMFF). Specifically, each sample encapsulated in a single file track contains one or more GPCC components. The GPCC components may be GPCC geometry components or GPCC attribute components. The so-called sample refers to a set of one or more encapsulation structures of point cloud, that is, each sample is composed of one or more Type-Length-Value ByteStream Format (TLV) encapsulation structures. FIG. 5B illustrates a schematic structural diagram of a sample according to an exemplary embodiment of this application. Referring to FIG. 5B, during transmission of a single file track, the sample in the file track is composed of the parameter set TLV (if any), geometry TLV and attribute TLV (if any) of GPCC, and the sample is encapsulated into a single file track.

Figure 5C:
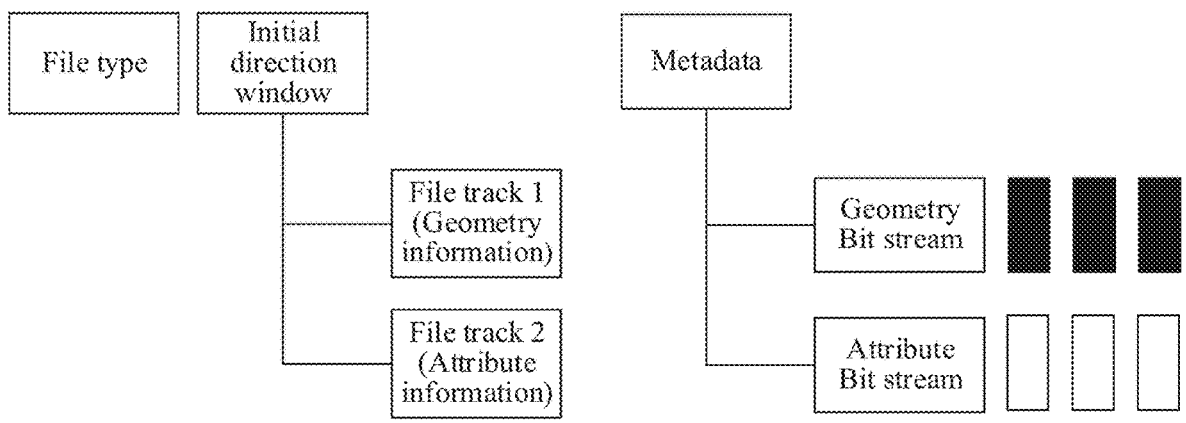
FIG. 5C illustrates a schematic structural diagram of a container containing a plurality of file tracks according to an exemplary embodiment of this application.
Figure 5D:
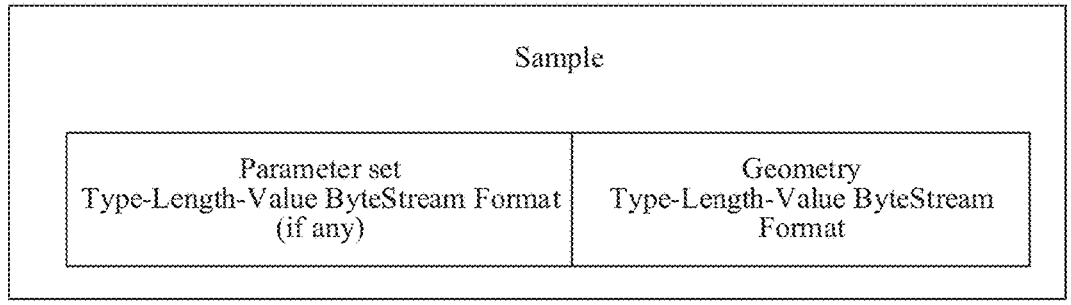
FIG. 5D illustrates a schematic structural diagram of a sample according to another exemplary embodiment of this application.

2. The GPCC bit stream is encapsulated in a plurality of file tracks. When the coded GPCC geometry bit stream and the coded GPCC attribute bit stream are transmitted in different file tracks, each sample in the file track contains at least one TLV encapsulation structure, the TLV encapsulation structure carries data of a single GPCC component, and the TLV encapsulation structure does not contain the coded GPCC geometry bit stream and the coded GPCC attribute bit stream at the same time. FIG. 5C illustrates a schematic structural diagram of a container containing a plurality of file tracks according to an exemplary embodiment of this application. Referring to FIG. 5C, a packet 1 transmitted in a file track 1 contains the geometry information (such as geometry TLV) of the coded GPCC geometry bit stream, and does not contain the attribute information (such as attribute TLV) of the coded GPCC attribute bit stream. A packet 2 transmitted in a file track 2 contains the coded GPCC attribute bit stream and does not contain the coded GPCC geometric bit stream. Since the video playing device is required to decode the coded GPCC geometry bit stream first when decoding, and the decoding of the coded GPCC attribute bit stream depends on the geometry information after decoding, different GPCC component bit streams are encapsulated in separate file tracks, so that the video playing device can access the file track carrying the coded GPCC geometric bit stream before the coded GPCC attribute bit stream. FIG. 5D illustrates a schematic structural diagram of a sample according to another exemplary embodiment of this application. Referring to FIG. 5D, during transmission of a plurality of file tracks, the coded GPCC geometry bit stream and the coded GPCC attribute bit stream are transmitted in different file tracks. The sample in the file track is composed of the parameter set TLV and the geometry TLV of GPCC. The sample does not contain the attribute TLV. The sample is encapsulated in any one of the plurality of file tracks.

In an implementation, the acquired point cloud data is coded and encapsulated by the video production device to form point cloud media. The point cloud media may be an entire media file of an object or a media segment of an object, such as a sequence of initialization segments and media segments for streaming. In addition, the video production device records the metadata of the encapsulation file of the point cloud media by adopting the Media Presentation Description (MPD), i.e., the description signaling file, according to file format requirements of the point cloud media. The metadata here is a general term for the information related to the point cloud media presentation. The metadata may include the description information of the point cloud media, the description information of the window and the signaling information related to point cloud media presentation. The video production device issues the MPD to the video playing device so that the video playing device requests to acquire the point cloud media according to the relevant description information in the MDP. Specifically, the point cloud media and the MDP are issued from video production device to the video playing device through a transmission mechanism, such as Dynamic Adaptive Streaming over HTTP (DASH) or Smart Media Transport (SMT).

II. Data Processing Process on Video Playing Device Side (1) Decapsulation and Decoding Processes of Point Cloud Data In an implementation, the video playing device may acquire the point cloud media through MDP signaling issued by the video production device based on a DASH interface. The process of file decapsulation on the video playing device side is reverse to the process of file encapsulation on the video production device side. The video playing device decapsulates the encapsulation file of the point cloud media according to the file format requirements of the point cloud media to obtain the coded bit stream (i.e., the GPCC bit stream or the VPCC bit stream). The decoding process on the video playing device side is reverse to the coding process on the video production device side. The video playing device decodes the coded bit stream to restore the point cloud data.

(2) Rendering Process of Point Cloud Data

In an implementation, the video playing device renders the point cloud data obtained through decoding of the GPCC bit stream according to the metadata related to rendering and window in the MDP signaling. After rendering, it realizes the presentation of the visual scene of the real world corresponding to the point cloud data.

It is to be understood that the system for processing point cloud media described in the embodiments of this application is intended to describe the technical solution of the embodiments of this application more clearly, and does not constitute the limitation on the technical solution provided by the embodiments of this application. As can be seen by a person skilled in the art, with the evolution of the system architecture and the emergence of new business scenes, the technical solution provided by the embodiments of this application is also applicable to similar technical problems.

Among the related technologies for multi-view videos, there is currently a technology that distinguishes a basic view from an auxiliary view for different views of a multi-view video, and associates the view concept with the file track entity. The scheme is as follows:

1. View Information of Volumetric Video

A multi-view volumetric video includes a basic view and an auxiliary view. In the process of reconstructing the three-dimensional scene, it is necessary to use one or more views of the volumetric video to synthesize and render a target view according to the watching position and direction of the user. The volumetric video corresponding to the auxiliary view needs to be synthesized according to the volumetric video data of the basic view.

ViewInfoStruct provides view information corresponding to the volumetric video.

The syntax of the view information structure of the volumetric video is as follows:

```
aligned(8) class ViewInfoStruct(camera_parameters_included_flag) {
unsigned int(16) view_id;
unsigned int(16) view_group_id;
String view_description;
unsigned int(1) basic_view_flag;
}
``` where view_id indicates the identity of the view; view_group_id indicates the identity of the view group to which the view belongs; view_description provides text description of the view, which is a UTF-8 string ending in a null value; when basic_view_flag is 1, it indicates that the current view is the basic view; and when basic_view_flag is 0, it indicates that the current view is not the basic view.

2. View Group Information of Volumetric Video

The view grouping of the volumetric video is to group a plurality of views of the volumetric video according to the dependency between views. A view group includes a basic view and any number of auxiliary views. The volumetric video data of one or more views selected from the view group based on the view group information can render the target view, and the basic view is mandatory.

ViewGroupInfoStruct provides the view group information of the volumetric video, which describes one or more views.

The syntax of the view group information structure of the volumetric video is as follows:

```
aligned(8) class ViewGroupInfoStruct( ) {
unsigned int(16) view_group_id;
String view_group_description;
unsigned int(8) num_views;
for (i=0; i < num_views; i++) {
    unsigned int(16) view_id;
    unsigned int(1) basic_view_flag;
    }
}
``` where view_group_id indicates the identity of the view group; view_group_description provides text description of the view group, which is a UTF-8 string ending in a null value; num_views indicates the number of views in the view group; view_id indicates the identity of the view in the view group; when basic_view_flag is 1, it indicates that the view is a basic view; when basic_view_flag is 0, it indicates that the view is not a basic view.

3. View Information Data Box of Volumetric Video

The view of the volumetric video and its corresponding atlas information are required to be indicated in V3CViewsBox. The sampling in the volumetric video track may correspond to the atlas corresponding to one or more views. Usually, one basic view corresponds to one separate atlas.

The syntax of the view information data box of the volumetric video is as follows:

```
Box Type: 'vpvw'
Container: V3CSampleEntry
Mandatory: no
Quantity: 0 or 1
aligned(8) class V3CViewsBox extends FullBox('vpvw',0,0) {
```

```
unsigned int(16) num_views;
for (i=0; i < num_views; i++) {
    ViewInfoStruct();
    unsigned int(8) num_v3c_tracks;
    for (j=0; j < num_v3c_tracks; j++)
        unsigned int(32) v3c_track_id;
    }
}
``` where num_views indicates the number of views in the volumetric video; num_v3c_tracks indicates the number of volumetric video tracks related to the current view; v3c_track_id indicates the identity of the volumetric video track carrying the atlas data corresponding to the current view.

4. View Group Data Box of Volumetric Video

Multi-view grouping includes grouping the atlas corresponding to the view and the volumetric video track where the atlas data is located. V3CViewGroupsBox provides the grouping information of the view and the volumetric video track information where the atlas corresponding to the view group is located, and the track group to which the volumetric video track where the atlas corresponding to the view is located belongs is represented through 3CTrackGroupBox.

The syntax of the view group data box of the volumetric video is as follows:

```
Box Type: 'vwvg'
Container: V3CSampleEntry
Mandatory: no
Quantity: 0 or 1
aligned(8) class V3CViewGroupsBox extends FullBox('vwvg',0,0) {
unsigned int(16) num_view_groups;
for (i=0; i < num_view_groups; i++) {
    ViewGroupInfoStruct( );
    unsigned int(32) v3c_track_group_id;
    }
}
``` where num_view_groups indicates the number of view groups in the volumetric video; v3c_trackgroup_id indicates the identity of the volumetric video track group, which carries all the atlas data corresponding to the view group of the volumetric video.

5. Multi-View Based Track Grouping

The atlases and the volumetric video tracks where the atlases are located are grouped according to the multi-view grouping of the volumetric video. TrackGroupTypeBox with track group type of 'vwtg' represents that the volumetric video track belongs to a volumetric video track group of one view group. The volumetric video track group corresponds to one atlas group, and the volumetric video tracks belonging to the same atlas group have the same track_group_id.

The syntax of multi-view based track grouping is as follows:

```
aligned(8) class V3CTrackGroupBox extends
trackGroupTypeBox('vwtg'){
}
aligned(8) class V3CSpatialRegionsBox extends FullBox('vpsr', 0 ,0) {
bit(1) all_tiles_in_single_track_flag;
bit(7) reserved = 0;
unsigned int(16) num_regions;
for (i=0; i < num_regions; i++) {
    3dSpatialRegionStruct(1);
    if (all_tiles_in_single_track_flag) {
        unsigned int(8) num_track_groups;
```

```
    for (j=0; j < num_track_groups; j++) {
        unsigned int(32) component_track_group_id:
        unsigned int(8) num_tiles;
        for (k=0; k < num_tiles; k++) {
            unsigned int(1 6) tile_id;
        }
    }
} else {
    unsigned int(8) num_tile_tracks;
    for(j=0; j < num_tile_tracks; j++) {
        unsigned int(32) tile_track_id;
    }
  }
 }
}
``` where all_tiles_in_single_track_flag indicates that all atlas tiles corresponding to the atlas are carried in the volumetric video track, or are respectively carried in atlas tile tracks; when the value is 1, it indicates that all atlas tiles are carried in the volumetric video track; when the value is 0, it indicates that all atlas tiles are respectively carried in the atlas tile tracks; num_regions indicates the number of three-dimensional spatial regions in the volumetric video; num_track_groups indicates the number of component track groups associated with a three-dimensional spatial region; component_track_group_id indicates the identity of the tile component track group corresponding to the volumetric video component track carrying the tile related to the three-dimensional spatial region; tile_id indicates the identity of the atlas NAL unit contained in the atlas tile related to the tile component track group, the value of tile_id plus 1 is equal to the groupID of an entry contained in the NALUMapEntry in the volumetric video track; num_tile_tracks indicates the number of the atlas tile media tracks related to the three-dimensional spatial region; tile_track_id indicates the identity of the atlas tile track media track related to the three-dimensional spatial region.

It can be seen from the above that different views of the multi-view video are grouped at present, and the basic view and the auxiliary view are distinguished in each group. When a multi-view video corresponds to a plurality of view groups, how to select the appropriate view group becomes a problem.

In order to solve the above technical problem, this application, by adding the spatial region information of each view group, enables a second device corresponding to a user to select an appropriate view group for requesting according to the spatial region information of the view group, thus enabling the user to quickly select an appropriate view group, and improving the processing efficiency and user experience of the multi-view video.

Figure 6:
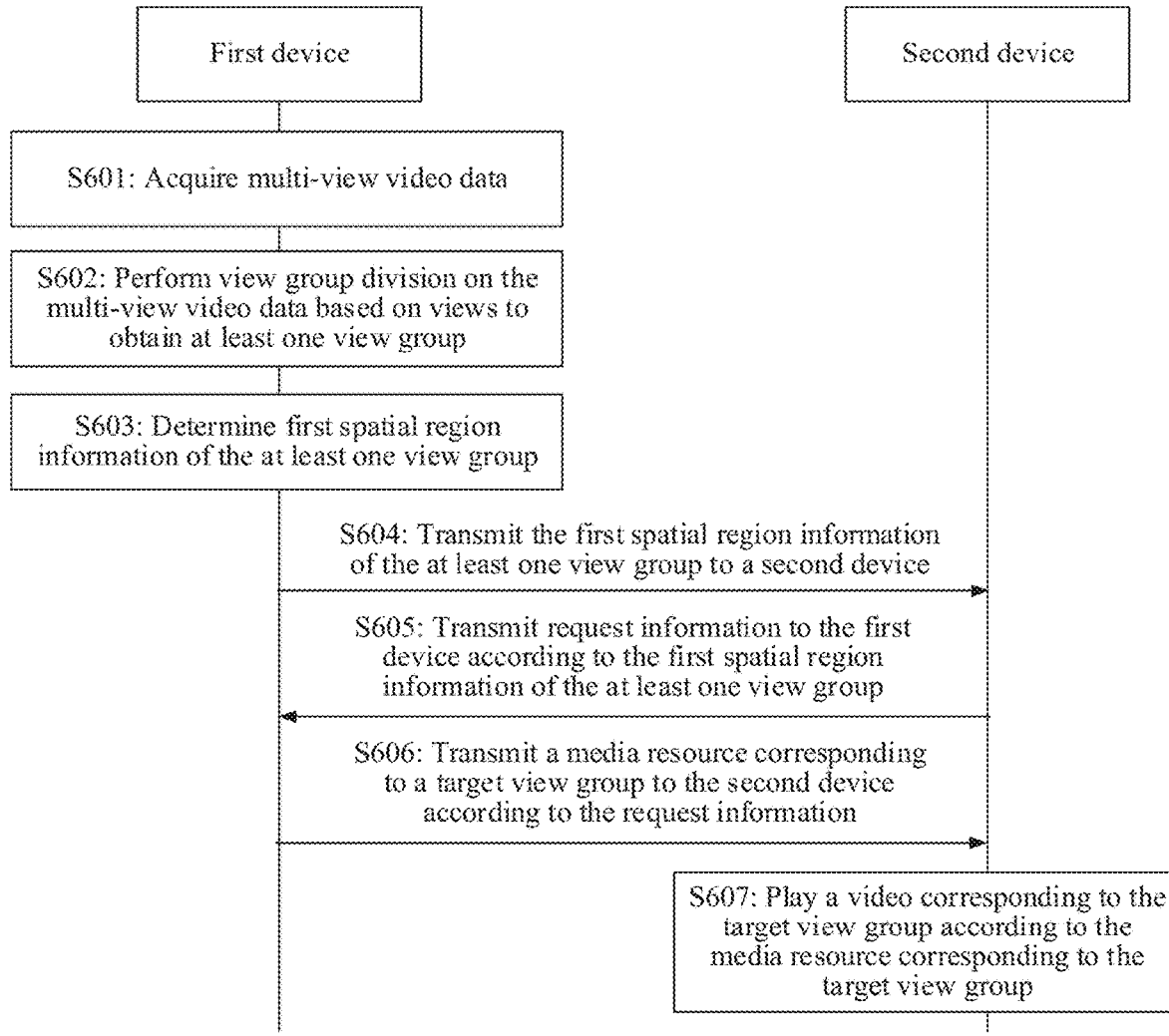
FIG. 6 illustrates an interaction flowchart of a method for processing a multi-view video according to an embodiment of this application.

The technical solution of this application is described in detail in the following:

FIG. 6 illustrates an interaction flowchart of a method for processing a multi-view video according to an embodiment of this application. Referring to FIG. 6, the method includes the following steps:

S601: Acquire, by a first device (e.g., first electronic device, first computer device, etc.), multi-view video data. The multi-view video data includes video data of a plurality of views.

S602: Perform, by the first device, view group division on the multi-view video data based on the views to obtain at least one view group.

S603: Determine, by the first device, first spatial region information of the at least one view group. The first spatial region information includes information of a three-dimensional spatial region where the view group is located.

S604: Transmit, by the first device, the first spatial region information to a second device.

S605: Transmit, by the second device, request information to the first device according to the first spatial region information. The request information is used for requesting a media resource corresponding to a target view group in the at least one view group.

S606: Transmit, by the first device, the media resource corresponding to the target view group to the second device according to the request information.

S607: Play, by the second device, a video corresponding to the target view group according to the media resource corresponding to the target view group.

The first device in this application is a device with a production function of the multi-view video data, for example, the video production device in FIG. 4 or FIG. 5A above, or an intermediate node of the video production device.

In some embodiments, the video production device is also referred to as a server side, a video coding device, a video coder, or the like.

The second device in this application is a device with a playing function of the multi-view video data, for example, the video playing device in FIG. 4 or FIG. 5A above, or an intermediate node of the video playing device.

In some embodiments, the video playing device is also referred to as a player side, a video decoding device, a video decoder, or the like.

The multi-view video data in this application includes video data of a plurality of different views.

In some embodiments, the multi-view video data in this application may also include other data such as audios and/or images. In the following description, description will be made by taking a video as an example, but this application is not limited thereto.

In the embodiments of this application, the multi-view video is usually shot from a plurality of angles by camera arrays to form texture information (color information, etc.) and depth information (spatial distance information, etc.) of the scene, and forms multi-view data media that can be consumed on the user side in combination with mapping information from 2D plane frames to 3D presentation spaces.

In some embodiments, the multi-view video data includes 6 Degrees of Freedom (6DoF) video data, restricted 3 Degrees of Freedom (3DoF+) video data and other media data that are rendered in 3D spaces. Description will be made by taking 6DoF media as an example.

The method provided by the embodiments of this application is applicable to applications such as recorded broadcasting, on-demand, broadcasting, live broadcasting and communication of multi-view video data content, program editing, and production.

In an example, the first device includes a camera array, which can shoot the scene from a plurality of angles to obtain the multi-view video data.

In another example, the first device obtains the multi-view video data from an acquisition device of the multi-view video data or a storage device of the multi-view video data. This application does not limit the way that the first device obtains the multi-view video data.

During consuming the multi-view video media, the view group is taken as a consumption unit. Therefore, after the first device obtains the multi-view video data, view grouping is performed on the multi-view video data. For example, the multi-view video data is divided into at least one view group according to the correlation of the views.

In some embodiments, the view is also called a viewpoint, and the corresponding view group is also called a viewpoint group.

In some embodiments, a view group includes at least one basic view.

In some embodiments, a view group further includes at least one auxiliary view.

The first spatial region described in this application may be understood as a 3D spatial region.

The first spatial region of the view group may be understood as an overall first spatial region of the view group, or a boundary first spatial region of the view group, which is the maximum first spatial region range after the combination of all views contained in the view group.

In some embodiments, the first spatial region of the view group is a cuboid.

In some embodiments, first spatial region information of the view group includes at least one of the following: identity information of the first spatial region, coordinate information of a reference point (or an anchor point) of the first spatial region, and the length of a bounding box of the first spatial region along the coordinate axis.

For example, the identity information of the first spatial region is 3d_region_id.

For example, in the Cartesian coordinate system, coordinate information of the reference point (or the anchor point) includes: the x coordinate, y coordinate and z coordinate of the reference point.

For example, the length of the bounding box of the first spatial region along the coordinate axis includes: the length dx of the bounding box along the x axis, the length dy of the bounding box along the y axis, and the length dz of the bounding box along the z axis.

Figure 7:
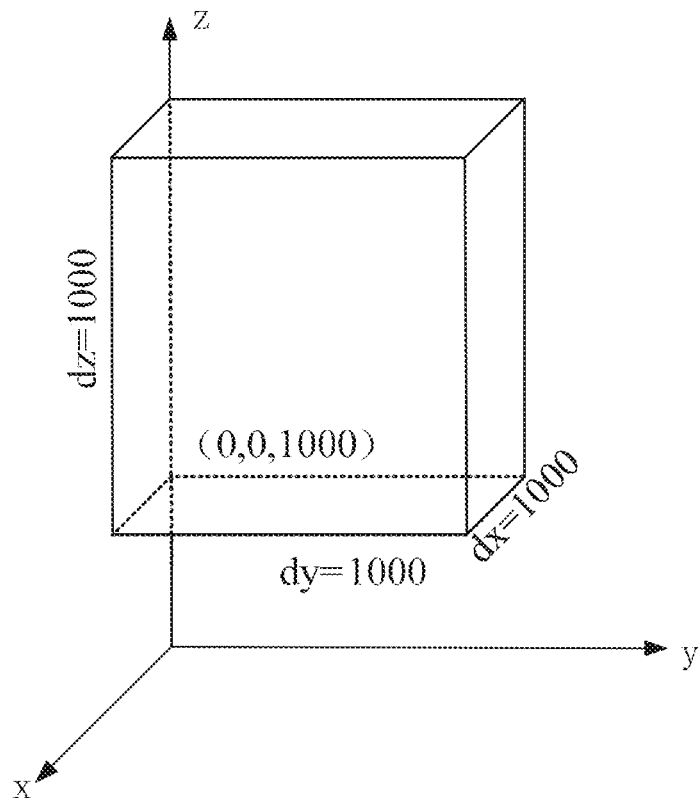
FIG. 7 illustrates a schematic diagram of a first spatial region of an exemplary view group according to this application.

In an example, FIG. 7 illustrates a schematic diagram of a first spatial region of an exemplary view group according to this application. The coordinates of an anchor point of the first spatial region are (0,0,1000), dx=1000, dy=1000, and dz=1000.

According to this application, after determining first spatial region information of each view group in at least one view group of the multi-view video data, the first device transmits the determined first spatial region information of the at least one view group to the second device. The second device selects a desired target view group according to the first spatial region information of each view group. For example, the second device selects the desired target view group according to the first spatial region information of each view group, as well as the content to be watched by the user and the network condition. For example, when the network condition is good and the user expects to watch video data of a plurality of view groups, the selected target view group may include the video data of the plurality of view groups. When the network condition is poor and the user expects to watch video data of a view group 1, the selected target view group includes the view group 1. After selecting the desired target view group, the second device transmits request information to the first device. The request information is used for requesting the first device to transmit the media resource corresponding to the target view group to the second device. In this way, after receiving the request information from the second device, the first device transmits the media resource corresponding to the target view group to the second device. After receiving the media resource corresponding to the target view group transmitted by the first device, the second device plays or renders the video corresponding to the target view group according to the media resource corresponding to the target view group.

Accordingly, it can be seen that, in this application, first spatial region information of at least one view group is transmitted to the second device through the first device, so that the second device accurately and quickly selects a target view group for watching from the at least one view group according to the first spatial region information indicating a view group. After acquiring request information for the target view group, the first device can transmit only a media resource corresponding to the target view group to the second device, without transmitting all media resources corresponding to multi-view video data to the second device, thus improving the transmission efficiency of media resources, enabling the second device to quickly acquire the media resource actually needed for watching, and improving the transmission efficiency of media resources in a multi-view video data scenario.

In a possible implementation, the request information transmitted by the second device to the first device includes identity information of the first spatial region corresponding to the target view group. For example, the user selects to watch the video data of the target view group according to the first spatial region information of each view group. The first spatial region of the target view group is a first spatial region 1. In this way, the second device carries identity information of the first spatial region 1 in the request information. In this way, after receiving the request information transmitted by the second device, the first device resolves the request information to obtain the identity information of the first spatial region 1. Based on the identity information of the first spatial region 1, the target view group corresponding to the identity information of the first spatial region 1 is found, and then the media resource corresponding to the target view group is transmitted to the second device.

In another possible implementation, the first spatial region information of each view group transmitted by the first device to the second device also includes the corresponding relationship between each view group and the first spatial region. The corresponding relationship between the view group and the first spatial region is, for example, the corresponding relationship between the identity information of the view group and the identity information of the first spatial region. In this way, the user selects the target view group according to the first spatial region information of each view group, obtains the identity information of the target view group, carries the identity information of the target view group in the request information, and transmits the request information to the first device. After receiving the request information transmitted by the second device, the first device resolves the request information, obtains the identity information of the target view group, and transmits the media resource corresponding to the target view group to the second device according to the identity information of the target view group.

Step S604 will be further described below with reference to FIG. 8.

Figure 8:
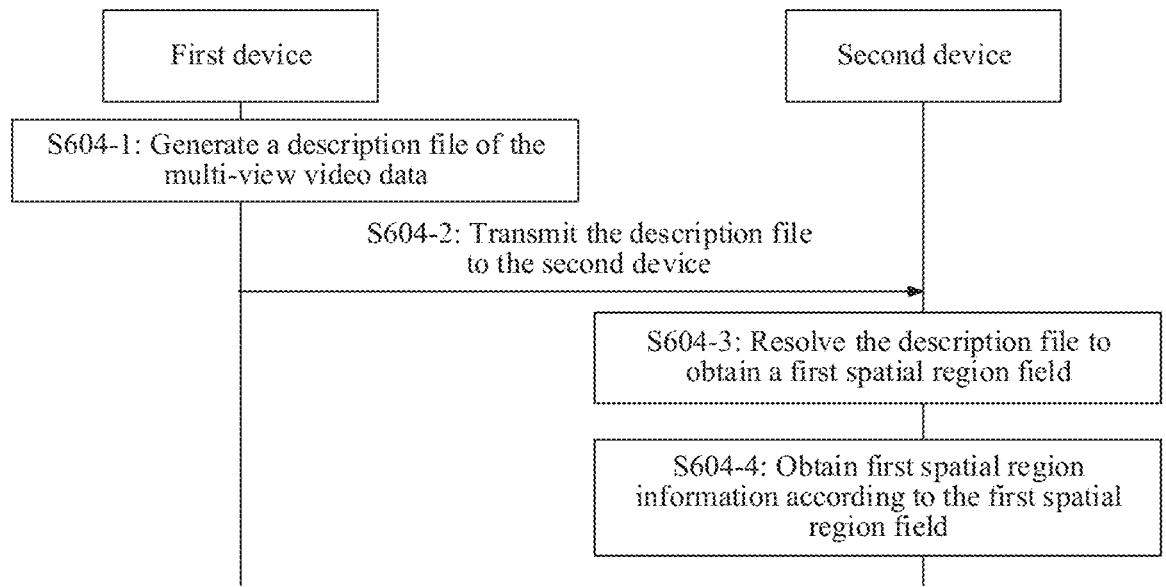
FIG. 8 illustrates an interaction flowchart of a method for processing a multi-view video according to an embodiment of this application.

FIG. 8 illustrates an interaction flowchart of a method for processing a multi-view video according to an embodiment of this application. Referring to FIG. 8, step S604 includes the following steps:

S604-1. Generate, by the first device, a description file of the multi-view video data. The description file includes a first spatial region field. The first spatial region field is used for indicating the first spatial region information.

S604-2: Transmit, by the first device, the description file to the second device.

S604-3: Resolve, by the second device, the description file to obtain the first spatial region field.

S604-4: Obtain, by the second device, the first spatial region information according to the first spatial region field.

In this embodiment, the description file includes the first spatial region information of each view group. The first device transmits the first spatial region information of each view group to the second device through the description file.

For example, the first device adds a first spatial region field in the description file. The first spatial region field is used for indicating first spatial region information of at least one view group. The first device transmits the description file to the second device. The second device resolves the description file, obtains the first spatial region field carried by the description file, and obtains the first spatial region information of each view group in at least one view group according to the first spatial region field.

In an example, the first spatial region field is V3CviewGroupInfo below.

In some embodiments, step S604-1 in which the first device generates the description file of the multi-view video data includes the following step: the first device adds the first spatial region field into the description file of Dynamic Adaptive Streaming over HTTP (DASH) of the multi-view video data.

In the embodiments of this application, several descriptive fields are added at a system layer, including field extension at a signaling transmission layer. In the following embodiment, description will be made by taking that the description file is Media Presentation Description (MPD) signaling supporting DASH as an example.

DASH signaling extension:

When a multi-view video is divided into a plurality of view groups, a V3CViewGroupInfo descriptor is required to describe the information of the view group. The descriptor is a SupplementalProperty element whose@schemeIdUri attribute is equal to "urn:mpeg:mpegI:v3c:2020: vwvg". The descriptor is at an adaptation set level or a representation level. The syntax description of the descriptor is as shown in Table 1.

TABLE 1

V3CViewGroupInfo descriptor attributes and elements

| Elements and attributes for VSCViewGroupInfo descriptor | Use | Data type | Description |
| --- | --- | --- | --- |
| Vwvg | 0 . . . 1 | v3c: V3CviewGroupsType | Container of descriptor |
| vwvg@numViewGroups | M | xs:unsignedShort | Indicate the number of view groups in volumetric video |
| vwvg. ViewGroupInfoStruct | 0 . . . N | v3: V3CViewGroupInfo | Information structure of view group |
| vwvg. ViewGroupInfoStruct@ v3cTrackGroupId | M | xs:unsignedByte | A track group identifier of view group |
| vwvg. ViewGroupInfoStruct@ viewGroupId | M | xs:unsignedShort | An identifier of view group |
| vwvg. ViewGroupInfoStruct.spatialRegion | M | v3c:spatialRegionType | Spatial information corresponding to view group |
| vwvg. ViewGroupInfoStruct.spactialRegion@id | M | xs:unsignedShort | An identifier for the 3D spatial region. The value of this attribute is required to match the value of the 3d_region_id field signaled for the corresponding region in the ISOBMFF container. |
| vwvg. ViewGroupInfoStruct.spatialRegion@x | M | xs:int | The x-coordinate of the reference point for the bounding box defining the spatial region |
| vwvg. ViewGroupInfoStruct.spatialRegion@y | M | xs:int | The y-coordinate of the reference point for the bounding box defining the spatial region |
| vwvg. ViewGroupInfoStruct.spatialRegion@z | M | xs:int | The z-coordinate of the reference point for the bounding box defining the spatial region |

TABLE 1-continued

V3CViewGroupInfo descriptor attributes and elements

| Elements and attributes for VSCViewGroupInfo descriptor | Use | Data type | Description |
|---|---|---|---|
| vwvg.ViewGroupInfoStruct.spatialRegion.cuboid | M | v3c:spatialRegionCuboidType | An element specifying a cuboid extending from the reference point of the spatial region. This element is present only when the spatialRegion@type attribute is set to 0. |
| vwvg.ViewGroupInfoStruct.spatialRegion.cuboid@dx | M | xs:int | The length of the bounding box along the x-axis (i.e., width). Negative values indicate a length that extends in the negative direction of the axis. |
| vwvg.ViewGroupInfoStruct.spatialRegion.cuboid@dy | M | xs:int | The length of the bounding box along the y-axis (i.e., height). Negative values indicate a length that extends in the negative direction of the axis. |
| vwvg.ViewGroupInfoStruct.spatialRegion.cuboid@dz | M | xs:int | The length of the bounding box along z axis (i.e., depth). Negative values indicate a length that extends in the negative direction of the axis. |

Legend:
For attributes: M = Mandatory, O = Optional, OD = Optional with Default value, CM = Conditionally Mandatory.
For elements: <minOccurs> . . . <maxOccurs> (N = unbounded)
Elements are bold; attributes are non-bold and preceded with an @.
(Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.)

From the above Table 1, it can be seen that information as shown in Table 1 is added into the description file, including the first spatial region information of at least one view group. Taking one view group as an example, Table 1 includes the first spatial region information of this view group, for example, including the identifier of the first spatial region (ViewGroupInfoStruct.spatialRegion@id), the x coordinate of the reference point of the bounding box of the first spatial region (ViewGroupInfoStruct.spatialRegion@x), the y coordinate of the reference point of the bounding box of the first spatial region (ViewGroupInfoStruct.spatialRegion@y), the z coordinate of the reference point of the bounding box of the first spatial region (ViewGroupInfoStruct.spatialRegion@z), the length (i.e., width) of the bounding box of the first spatial region along x axis (ViewGroupInfoStruct.spatialRegion.cuboid@dx), the length (i.e., height) of the bounding box of the first spatial region along y axis (ViewGroupInfoStruct.spatialRegion.cuboid@dy), and the length (i.e., depth) of the bounding box of the first spatial region along z axis (ViewGroupInfoStruct.spatialRegion.cuboid@dz).

The second device receives the description file as shown in Table 1 transmitted by the first device, resolves the description file as shown in Table 1, and thus can obtain the spatial region information of each view group in at least one view group.

In some embodiments, the method according to the embodiments of this application further includes: adding a second spatial region field into the spatial region structure of the media file of the multi-view video data. The second spatial region field is used for indicating the first spatial region information.

That is, in addition to field extension at a signaling transmission layer, this application further performs field extension at a file encapsulation layer. For example, a second spatial region field is added into the spatial region structure of the media file of the multi-view video data. The second spatial region field is used for indicating the first spatial region information.

In an example, the second spatial region field is View-GroupSpatialInfo.

Taking the ISOBMFF data box as an example, the extension of the ISOBMFF data box is as follows:

```
aligned(8) class 3DSpatialRegionStruct(dimensions_included_flag) {
unsigned int(16) 3d_region_id;
3DPoint anchor;
if (dimensions_included_flag) {
    CuboidRegionStruct( );
    }
}
aligned(8) class ViewGroupInfoStruct( ) {
unsigned int(16) view_group_id;
String view_group_description;
ViewGroupSpatialInfo 3DSpatialRegionStruct(1);
unsigned int(8) num_views;
for (i=0; i < num_views; i++) {
    unsigned int(16) view_id;
    unsigned int(1) basic_view_flag;
    }
}
``` where 3d_region_id represents the identifier of the spatial region, x, y, z represents the x, z, y coordinate values of the 3D points in the Cartesian coordinate system;

cuboid_dx, cuboid_dy and cuboid_dz represents the dimensions of the cuboid sub-regions in the Cartesian coordinate system relative to the anchor point along the x, y, z axis;

anchor represents a 3D point as an anchor of the 3D spatial region in the Cartesian coordinate system;

dimensions_included_flag represents an identifier indicating whether the spatial region dimension has been marked;

ViewGroupSpatialInfo represents a 3D spatial region structure, indicating the maximum spatial region range after the combination of all views contained in the view group.

This application further includes associating the view with the second spatial region corresponding to the view. The second spatial region is the spatial region corresponding to the volumetric video track. In this way, when the user needs to watch the video of the target view, the second spatial region information associated with the target view can be quickly obtained, and the media resource corresponding to the target view can be obtained according to the track and atlas tile information associated with the second spatial region, the second spatial region information includes the information of the three-dimensional spatial region where the volumetric video track is located.

Figure 9:
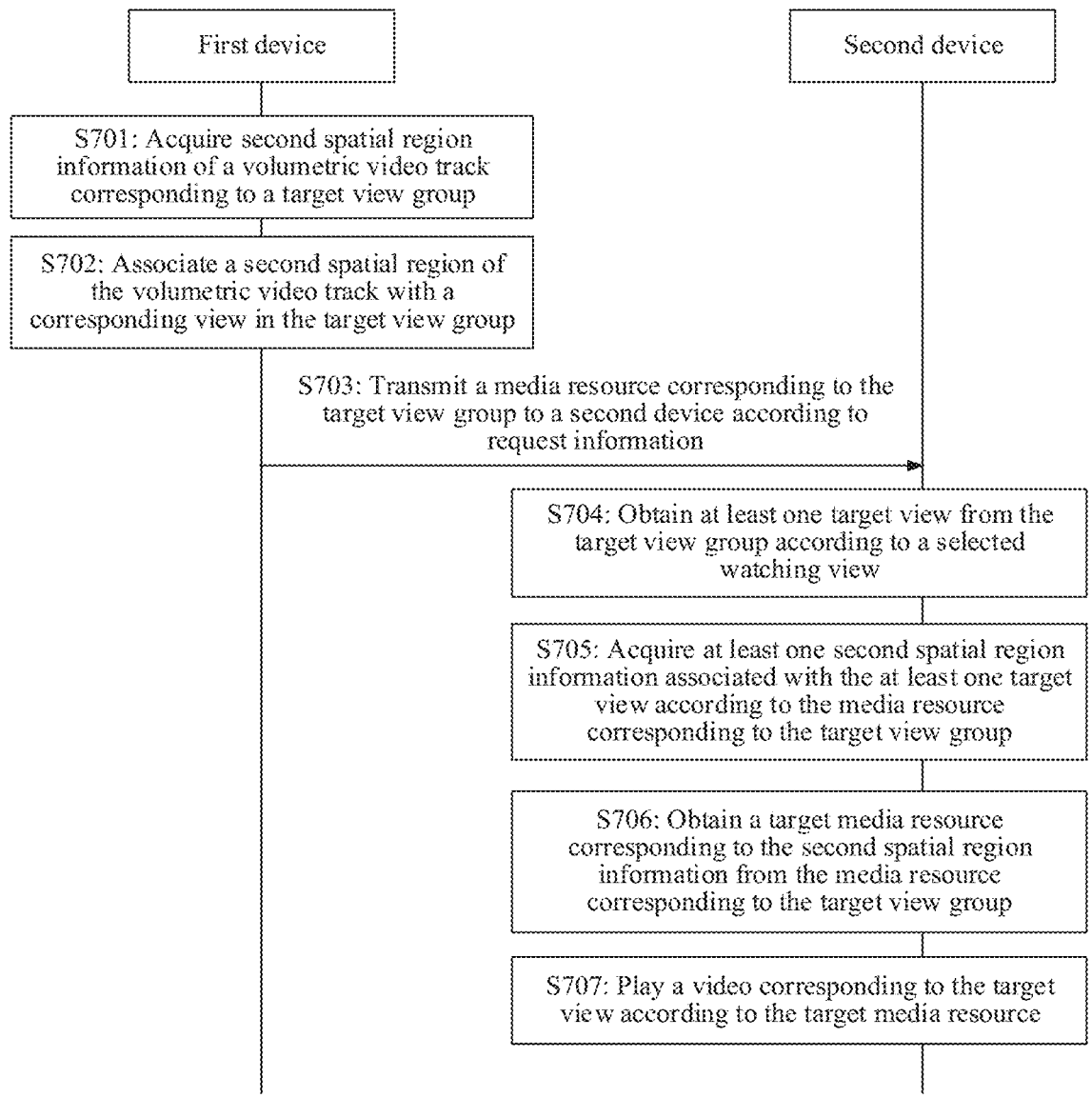
FIG. 9 illustrates an interaction flowchart of a method for processing a multi-view video according to an embodiment of this application.

FIG. 9 illustrates an interaction flowchart of a method for processing a multi-view video according to an embodiment of this application. Referring to FIG. 9, the method according to the embodiment of this application includes the following steps:

S701: Acquire, by a first device, second spatial region information of a volumetric video track corresponding to a target view group.

S702: Associate, by the first device, the second spatial region of the volumetric video track with a corresponding view in the target view group.

In this application, a volumetric video track may include a plurality of different second spatial regions.

In some embodiments, the second spatial region is a 3D spatial region.

In some embodiments, one view group corresponds to one volumetric video track group. In this application, the volumetric video track corresponding to the target view group may be understood as the volumetric video track group of the target view group.

When one volumetric video track corresponds to a plurality of views, the first device associates the second spatial region of the volumetric video track with each of the plurality of views. For example, the second spatial region of the volumetric video track corresponding to the target view is associated with each view in the target view group.

Each view in the target view group is associated with at least one second spatial region of the volumetric video track.

One second spatial region is associated with one view.

In some embodiments, the above steps S701 and S702 may be performed before the first device receives the request information transmitted by the second device, or after the second device receives the request information transmitted by the second device, which is not limited in this application.

S703: Transmit, by the first device, a media resource corresponding to the target view group to a second device according to the request information. The media resource corresponding to the target view group includes association information of each view in the target view group and at least one second spatial region of the volumetric video track.

Based on the above S701 to S702, the above step S607 in which the second device plays the video corresponding to the target view group according to the media resource corresponding to the target view group includes steps S704 to S706.

S704: Obtain, by the second device, at least one target view from the target view group according to a selected watching view.

S705: Acquire, by the second device, at least one second spatial region information associated with the at least one target view according to the media resource corresponding to the target view group.

S706: Obtain, by the second device, a target media resource corresponding to the second spatial region information from the media resource corresponding to the target view group.

S707: Play, by the second device, a video corresponding to the target view according to the target media resource.

From the above steps S701 and S702, it can be seen that the first device associates each view in the target view group with at least one second spatial region of the volumetric video track corresponding to the target view group. The association information is carried in the media resource corresponding to the target view group. In this way, after receiving the request information transmitted by the second device, the first device transmits the media resource corresponding to the target view group to the second device. The media resource corresponding to the target view group includes at least one second spatial region associated with each view in the target view group. In this way, after receiving the media resource corresponding to the target view group, the second device obtains the at least one target view from the target view group according to the watching view selected by the user, queries the at least one second spatial region information associated with each target view in at least one target view from the media resource corresponding to the target view group, and obtains the corresponding media resource for presentation according to the tile and track information corresponding to the second spatial region aiming at each second spatial region information in the at least one second spatial region information.

In an example, the at least one target view includes a basic view of the target view group.

In another example, the at least one target view includes at least one auxiliary view of the target view group in addition to the basic view of the target view group.

In a possible implementation, the media resource corresponding to the target view group includes spatial information metadata (V3CSpatialRegionsBox). The association information of each view in the target view group and the second spatial region is carried in the metadata.

In some embodiments, step S702 includes the following steps S702-1 and S702-2.

S702-1: Add, by the first device, an association flag into a spatial region data box of a media file format data box of the target view group. The association flag is used for indicating whether the second spatial region is associated with a corresponding view in the target view group.

S702-2: Add, by the first device, a view identity into the spatial region data box when it is determined the second spatial region is associated with the corresponding view in the target view group. The view identity is used for indicating identity information of the view associated with the second spatial region.

In this embodiment, the association relationship between the second spatial region and the view is represented by the association flag.

In an example, the association flag is view_associated_flag, which is used for indicating whether the second spatial region is associated with the corresponding view in the target view group.

The first device determines the value of the association flag according to the association relationship between the second spatial region and the corresponding view in the target view group, as shown in Table 2.

TABLE 2

| Value of view_associated_flag | Result of association between second spatial region and view |
| --- | --- |
| 0 | Not associated |
| 1 | Associated |

From Table 2, it can be seen that the first device assigns different values to view_associated_flag to indicate whether the second spatial region is associated with the view.

The first device adds the view identity into the spatial region data box of the media file format data box of the target view group when it is determined the second spatial region is associated with the corresponding view in the target view group. The view identity is used for indicating identity information of the view associated with the second spatial region.

For example, the view identity is view_id.

Taking the ISOBMFF data box as an example, this application adds an association flag into the spatial region data box of the ISOBMFF data box, and adds a view identity into the spatial region data box of the ISOBMFF data box when it is determined the second spatial region is associated with a view. The extension of the ISOBMFF data box in this application is as follows:

```
aligned(8) class 3DSpatialRegionStruct(dimensions_included_flag) {
unsigned int(16) 3d_region_id;
3DPoint anchor;
if (dimensions_included_flag) {
    CuboidRegionStruct( );
    }
}
```

-continued

```
aligned(8) class ViewGroupInfoStruct( ) {
unsigned int(16) view_group_id;
String view_group_description;
ViewGroupSpatialInfo 3DSpatialRegionStruct(1);
unsigned int(8) num_views;
for (i=0; i < num_views; i++) {
    unsigned int(16) view_id;
    unsigned int(1) basic_view_flag;
    }
}
aligned(8) class V3CSpatialRegionsBox extends FullBox('vpsr', 0 ,0) {
bit(1) all_tiles_in_single_track_flag;
bit(1) view_associated_flag;
bit(6) reserved = 0;
unsigned int(16) num_regions;
for (i=0; i < num_regions; i++) {
if(view_associated_flag) {
    unsigned int(16) view_id;
}
    3dSpatialRegionStruct(1);
    if (all_tiles_in_single_track_flag) {
        unsigned int(8) num_track_groups;
        for (j=0; j <num_track_groups; j++) {
            unsigned int(32) component_track_group_id;
            unsigned int(8) num_tiles;
            for (k=0; k < num_tiles; k++) {
                unsigned int(16) tile_id;
            }
        }
    } else {
        unsigned int(8) num_tile_tracks;
        for (j=0; j < num_tile_tracks; j++) {
            unsigned int(32) tile_track_id;
        }
    }
}
aligned(8) class V3CVolumetricMetadataSample( ) {
bit(1) region_updates_flag;
bit(1) object_updates_flag;
bit(1) view_associated_flag;
bit(5) reserved = 0;
if (region_updates_flag) {
    unsigned int(16) num_regions;
    for (i=0; i < num_regions; i++) {
        3DSpatialRegionStruct(dimensions_included_flag);
if(view_associated_flag){
    unsigned (16) view_id;
}
        bit(1) update_mapping_flag;
        bit(7) reserved = 0;
        if (update_mapping_flag) {
            if (all_tiles_in_single_track_flag) {
                unsigned int(8) num_track_groups;
                for (j=0; j < num_track_groups; j++) {
                    unsigned int(32) component_track_group_id;
                    unsigned int(8) num_tiles;
                    for (k=0; k < num_tiles; k++) {
                        unsigned int(16) tile_id;
                    }
                }
            } else {
                unsigned int(8) num_tile_tracks;
                for(int j=0; j < num_tile_tracks; j++) {
                    unsigned int(32) tile_track_id;
                }
            }
        }
    }
}
}
``` the above bold fields are new to this application;

where 3d_region_id represents the identifier of the spatial region;

x, y, z represents the x, z, y coordinate values of the 3D points in the Cartesian coordinate system;

cuboid_dx, cuboid_dy and cuboid_dz represents the dimensions of the cuboid sub-regions in the Cartesian coordinate system relative to the anchor point along the x, y, z axis;

anchor represents a 3D point as an anchor of the 3D spatial region in the Cartesian coordinate system;

dimensions_included_flag represents an identifier indicating whether the spatial region dimension has been marked;

ViewGroupSpatialInfo represents a 3D spatial region structure, indicating the maximum spatial region range after the combination of all views contained in the view group;

view_associated_flag indicates whether the spatial region is associated with the view; when the value of this field is 1, it indicates that the spatial region is associated with the view, and when the value is 0, it indicates that the spatial region is not associated with the view.

view_id indicates the identifier of the view associated with the current spatial region. (When the spatial region is associated with the view, one spatial region is associated with only one view, and it is allowed that a plurality of spatial regions are associated with the same view.)

It can be seen from the above that the media resource corresponding to the target view group includes a media file format data box of the target view group, such as an ISOBMFF data box.

At this time, step S705 includes the following steps S705-1 to S705-3.

S705-1: Resolve, by the second device, the media resource corresponding to the target view group to obtain an association flag in the second spatial region data box of the media file format data box of the target view group. The association flag is used for indicating whether the second spatial region is associated with a corresponding view in the target view group.

S705-2: Resolve, by the second device, the media resource corresponding to the target view group to obtain a view identity in the second spatial region data box of the media file format data box of the target view group when a value of the association flag is a first value. The view identity is used for indicating identity information of the view associated with the second spatial region.

S705-3: Obtain at least one second spatial region information associated with the at least one target view from a media file data box of the target view group according to the view identity associated with the second spatial region and an identity of the at least one target view.

The first value is used for indicating that the second spatial region is associated with the corresponding view in the target view group.

In some embodiments, the first value is 1.

In this embodiment, the first device adds the association flag and the view identity into the second spatial region data box of the media file format data box of the target view group. After the second device obtains the media resource corresponding to the target view group transmitted by the first device, the second device selects at least one view in the target view group as the target view for watching according to the watching view of the user. In this way, the second device resolves the media resource corresponding to the target view group, and obtains the association flag in the second spatial region data box of the media file format data box of the target view group. When the value of the association flag is 1, it continues to resolve the media resource corresponding to the target view group to obtain the view identity, and determines whether the view identity is the same as the identity of the target view. If so, it obtains the second spatial region information associated with the view identity. By analogy, at least one second spatial region information corresponding to each target view in at least one target view can be obtained. Then, the media resource corresponding to the second spatial region information is obtained for rendering according to the second spatial region information.

That is, the application can accurately resolve the media resource corresponding to the second spatial region through the association information of the target view and the second spatial region. In other words, when the user consumes the multi-view video data, it is possible to decode only the view required for consumption according to the specific needs. Compared with the related technologies, which resolve the media resource corresponding to each second spatial region pair one by one, and then determine whether the media resource corresponding to the second spatial region pair corresponds to the target view, this application greatly improves the accuracy of media resource playing, reduces the loss of the computing resources of the device, improves the media playing efficiency, and thus improves the user experience.

The technical solution of this application will be further introduced below through examples.

1. It is assumed that the first device has a multi-view video view A, which is divided into 2 view groups, namely:

{view group1: anchor=(0,0,0), dx=1000, dy=1000, dz=1000}

{view group2: anchor=(1000,0,0), dx=1000, dy=1000, dz=1000} where anchor represents the anchor point of the spatial region of the view group, and dx, dy and dz represent the side lengths of the cuboid of the spatial region of the view group.

view group1 includes view1 and view2, where view1 is a basic view and view2 is an auxiliary view.

view group2 includes view3, view4, and view5, where view3 is a basic view, and view4 and view5 are auxiliary views. In some embodiments, view4 and view5 are both contained in the same volumetric video track.

2. The first device transmits the DASH signaling file of the multi-view video data to the second device. The signaling file contains overall spatial region information (i.e., the first spatial region information) of view group1 and view group1.

3. According to the content to be watched by the user and the network condition, user 1 requests a media resource corresponding to view group1; user 2 requests a media resource corresponding to view group2: user 3 requests media resources corresponding to view group1+view group2. After receiving a request transmitted by each user through the second device, the first device transmits the media resource requested by each user to the second device, so that the second device presents the same to the user.

4. For user 2, in the metadata V3CSpatialRegionsBox of spatial information, view_associated_flag=1, and region1 is associated with view4, and region2 is associated with view5. When user 2 needs to select atlas information of view4, the corresponding media resource is acquired for presentation according to tile and track information corresponding to region1.

5. For user 3, in regard to the received complete multi-view video, part of the media resource can still be selectively decoded and presented according to spatial information of the view group.

It is to be understood that FIG. 6 to FIG. 9 are only examples of this application, thus not constituting limitations to this application.

The preferred implementations of this application are described in detail above with reference to the accompanying drawings. However, this application is not limited to the specific details in the foregoing implementations, a plurality of simple deformations may be made to the technical solution of this application within a range of the technical concept of this application, and these simple deformations fall within the protection scope of this application. For example, the specific technical features described in the above specific implementations may be combined in any suitable manner without contradiction. To avoid unnecessary repetition, various possible combinations are not further described in this application. For another example, various different implementations of this application may alternatively be combined randomly. Such combinations should also be considered as the content disclosed in this application provided that these combinations do not depart from the concept of this application.

The method embodiments of this application are described in detail above with reference to FIG. 6 to FIG. 9. The device embodiments of this application will be described in detail below with reference to FIG. 10 to FIG. 12.

Figure 10:
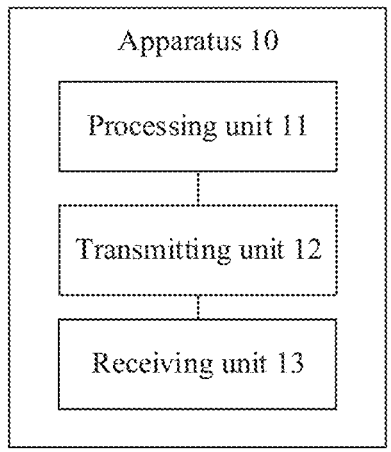
FIG. 10 illustrates a schematic structural diagram of an apparatus for processing multi-view video data according to an embodiment of this application.

FIG. 10 illustrates a schematic structural diagram of an apparatus for processing multi-view video data according to an embodiment of this application. The apparatus 10 is applied to a first device. The apparatus 10 includes:
- a processing unit 11 configured to acquire multi-view video data, the multi-view video data including video data of a plurality of views; perform view group division on the multi-view video data based on the views to obtain at least one view group; and determine first spatial region information of the at least one view group; and
- an encapsulation unit (not shown) configured to encapsulate the multi-view video data and the first spatial region information.

In a possible implementation, the apparatus 10 further includes a transmitting unit 12 configured to transmit the first spatial region information to a second device; and
- a receiving unit 13 configured to receive request information transmitted by the second device according to the first spatial region information, the request information being used for requesting a media resource corresponding to a target view group in the at least one view group.

The transmitting unit 12 is further configured to transmit the media resource corresponding to the target view group to the second device according to the request information.

In some embodiments, the processing unit 11 is further configured to acquire second spatial region information of a volumetric video track corresponding to the target view group; and associate the second spatial region of the volumetric video track with a corresponding view in the target view group.

In some embodiments, there is at least one second spatial region associated with a view in the target view group.

In some embodiments, the processing unit 11 is configured to add an association flag into a spatial region data box of a media file format data box of the target view group, the association flag being used for indicating whether the second spatial region is associated with a corresponding view in the target view group. In some embodiments, the processing unit 11 is configured to add a view identity into the spatial region data box during association, the view identity being used for indicating flag information of the view associated with the second spatial region.

In some embodiments, the processing unit 11 is configured to generate a description file of the multi-view video data. The description file includes a first spatial region field. The first spatial region field is used for indicating the first spatial region information. The transmitting unit 12 is further configured to transmit the description file to the second device.

In some embodiments, the description file is a description file of DASH, and the processing unit 11 is specifically configured to add the first spatial region field into the description file of DASH of the multi-view video data.

In some embodiments, the processing unit 11 is further configured to add a second spatial region field into the spatial region structure of the media file of the multi-view video data. The second spatial region field is used for indicating the first spatial region information.

It is to be understood that the device embodiments and the method embodiments may correspond to each other, and for similar description, a reference can be made to the method embodiments. To avoid repetition, details are not described herein again. Specifically, the apparatus 10 illustrated in FIG. 10 can execute the method embodiments corresponding to the first device, and the foregoing and other operations and/or functions of each module in the apparatus 10 are respectively intended to implement the method embodiments corresponding to the first device. For simplicity, it will not be repeated here.

Figure 11:
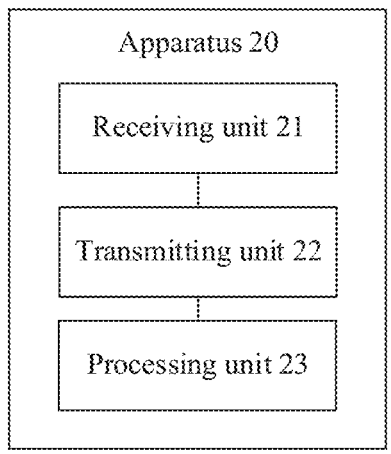
FIG. 11 illustrates a schematic structural diagram of an apparatus for processing multi-view video data according to another embodiment of this application.

FIG. 11 illustrates a schematic structural diagram of an apparatus for processing multi-view video data according to an embodiment of this application. The apparatus 20 is applied to a second device. The apparatus 20 includes:
- a receiving unit 21 configured to receive first spatial region information of at least one view group transmitted by a first device, the at least one view group being obtained by performing view group division on the multi-view video data based on views, the multi-view video data including video data of a plurality of views;
- a transmitting unit 22 configured to transmit request information to the first device according to the first spatial region information, the request information being used for requesting a media resource corresponding to a target view group in the at least one view group,
- the receiving unit 21 is further configured to receive the media resource corresponding to the target view group transmitted by the first device according to the request information, and
- a processing unit 23 configured to play a video corresponding to the target view group according to the media resource corresponding to the target view group.

In some embodiments, the corresponding view in the target view group is associated with at least one second spatial region of a volumetric video track corresponding to the target view group.

In some embodiments, the processing unit 23 is configured to obtain at least one target view from the target view group according to a selected watching view; acquire at least one second spatial region information associated with the at least one target view according to the media resource corresponding to the target view group; obtain a target media resource corresponding to the second spatial region information from the media resource corresponding to the target view group; and play a video corresponding to the target view according to the target media resource.

In some embodiments, the media resource corresponding to the target view group includes a spatial region data box of a media file format data box of the target view group, and the processing unit 23 is specifically configured to resolve the media resource corresponding to the target view group to obtain an association flag in the spatial region data box of the media file format data box of the target view group, the association flag being used for indicating whether the second spatial region is associated with a corresponding view in the target view group; resolve the media resource corresponding to the target view group to obtain a view identity in the second spatial region data box of the media file format data box of the target view group when a value of the association flag is a first value, the view identity being used for indicating identity information of the view associated with the second spatial region, the first value being used for indicating that the second spatial region is associated with a corresponding view in the target view group; and obtain at least one second spatial region information associated with each target view in the at least one target view from a media file data box of the target view group according to the view identity associated with the second spatial region and an identity of the at least one target view.

In some embodiments, the at least one target view includes a basic view of the target view group.

In some embodiments, the at least one target view further includes at least one auxiliary view of the target view group.

In some embodiments, the receiving unit 21 is specifically configured to receive a description file of the multi-view video data transmitted by the first device. The description file includes a first spatial region field. The first spatial region field is used for indicating the first spatial region information of the at least one view group.

In some embodiments, the first spatial region field is added into the description file of DASH of the multi-view video data.

It is to be understood that the device embodiments and the method embodiments may correspond to each other, and for similar description, a reference can be made to the method embodiments. To avoid repetition, details are not described herein again. Specifically, the apparatus 20 illustrated in FIG. 11 can execute the method embodiments corresponding to the second device, and the foregoing and other operations and/or functions of each module in the apparatus 20 are respectively intended to implement the method embodiments corresponding to the second device. For simplicity, it will not be repeated here.

The apparatuses according to the embodiments of this application are described above from the perspective of functional modules with reference to the drawings. It is to be understood that the functional modules may be implemented in the form of hardware, through instructions in the form of software, or through a combination of hardware and software modules. Specifically, the steps of the methods disclosed with reference to the embodiments of this application may be directly performed and completed by using a hardware decoding processor, or may be performed and completed by using a combination of hardware and software modules in the decoding processor. In some embodiments, the software module may be located in a mature storage medium in the art, such as a random access memory, a flash memory, a read-only memory, a programmable read-only memory, an electrically-erasable programmable memory, and a register. The storage medium is located in the memory. The processor reads information in the memory and completes the steps of the foregoing method embodiments in combination with hardware thereof.

Figure 12:
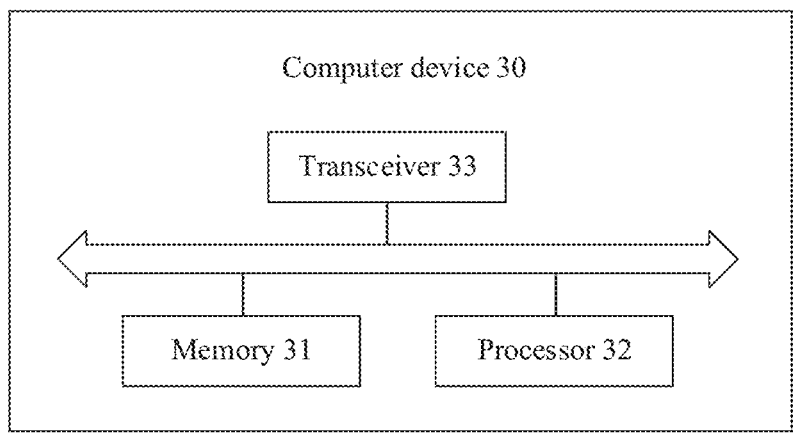
FIG. 12 illustrates a schematic block diagram of a computer device according to an embodiment of this application.

FIG. 12 illustrates a schematic block diagram of a computing device according to an embodiment of this application. The computing device may be the first device or the second device described above, or may include the first device and the second device.

Referring to FIG. 12, the computing device 30 may include;

a memory 31 and a memory 32. The memory 31 is configured to store a computer program and transmit program codes to the memory 32. In other words, the memory 32 can call and run a computer program from the memory 31 to implement the methods in the embodiments of this application.

For example, the memory 32 may be configured to execute the above method embodiments according to instructions in the computer program.

In some embodiments of this application, the memory 32 may include, but not limited to:

a general purpose processor, a Digital Signal Processor (DSP), an Application-Specific Integrated Circuit (ASIC), a Field Programmable Gate Array (FPGA) or another programmable logic device, a discrete gate, a transistor logic device, a discrete hardware component, etc.

In some embodiments of this application, the memory 31 includes, but not limited to:

a volatile memory and/or non-volatile memory. The non-volatile memory may be a read-only memory(ROM), a programmable read-only memory(PROM), an erasable programmable read-only memory (EPROM), an electrically erasable programmable read-only memory (EEPROM) or a flash memory. The volatile memory may be a random access memory (RAM), used as an external cache. By way of exemplary description instead of restrictive description, many forms of RAMs may be used, including, for example, Static RAM (SRAM), Dynamic RAM (DRAM), Synchronous DRAM (SDRAM), Double Data Rate SDRAM (DDR SDRAM), Enhanced SDRAM (ESDRAM), synch Link DRAM (SLDRAM), and Direct Rambus RAM (DR RAM).

In some embodiments of this application, the computer program can be divided into one or more modules, which are stored in the memory 31 and executed by the memory 32 to complete the methods provided in this application. The one or more modules may be a series of computer program instruction segments that can complete specific functions. The instruction segments are used for describing the execution process of the computer program in the video production device.

Referring to FIG. 12, the computing device 30 may further include:

a transceiver 30. The transceiver 33 can be connected to the memory 32 or the memory 31.

The memory 32 can control the transceiver 33 to communicate with other devices. Specifically, it can transmit information or data to or receive information or data from other devices. The transceiver 33 may include a transmitter and a receiver. The transceiver 33 may further include antennas, the number of which may be one or more.

Various components of the video production device are connected to each other by using a bus system. In addition to including a data bus, the bus system further includes a power bus, a control bus, and a status signal bus.

This application further provides a non-transitory computer readable storage medium. The computer readable storage medium stores a computer program, and when the computer program is executed by a computer, the method in any one of the foregoing embodiments is implemented by the computer. In some embodiments, a computer program product including instructions is further provided. When the instructions run on a computer, the computer is caused to perform the method provided in the foregoing method embodiments.

When software is used to implement the embodiments, the embodiments may be implemented completely or partially in a form of a computer program product. The computer program product includes one or more computer instructions. When the program instruction of the computer is loaded and executed on the computer, all or some of the steps are generated according to the process or function described in the embodiments of this application. The computer may be a general-purpose computer, a special-purpose computer, a computer network, or another programmable apparatus. The computer instructions may be stored in a non-transitory computer readable storage medium or transmitted from one computer readable storage medium to another computer readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer-readable storage medium may be any usable medium accessible by the computer, or a data storage device, such as a server or a data center, including one or more usable media. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may be aware that, in combination with the examples described in the embodiments disclosed in this specification, modules and algorithm steps may be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners.

For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual requirements to implement the objectives of the solutions of the embodiments. For example, functional modules in the embodiments of this application may be integrated into one processing module, or each of the modules may exist alone physically, or two or more modules may be integrated into one module.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs file generation and/or transmission. In practical application, the foregoing functions may be allocated to and completed by different functional modules according to requirements, that is, an inner structure of a device is divided into different functional modules to implement all or a part of the functions described above.

What is claimed is:

1. A method for processing a multi-view video, performed at a computer device, the method comprising:
    acquiring multi-view video data, the multi-view video data including video data of multiple views;
    performing view group division on the multi-view video data based on the multiple views to obtain multiple view groups;
    determining first spatial region information of the multiple view groups, the first spatial region information including identity information of the first spatial region, coordinate information of a reference point of the first spatial region, and a length of a bounding box of the first spatial region along a coordinate axis of a three-dimensional spatial region where the multiple view groups are located;
encapsulating the multi-view video data and the first spatial region information;
transmitting the first spatial region information to a second computer device;
receiving request information transmitted by the second computer device, wherein the request information identifies a media resource corresponding to a target view group of the multiple view groups according to the first spatial region information; and
transmitting the requested media resource corresponding to the target view group to the second computer device according to the request information.

2. The method according to claim 1, further comprising:
acquiring second spatial region information of a volumetric video track corresponding to the target view group, the second spatial region information including information of a second spatial region where the volumetric video track is located, the second spatial region is a three-dimensional region; and
associating the second spatial region of the volumetric video track with a corresponding view in the target view group.

3. The method according to claim 2, wherein there is at least one second spatial region associated with a view in the target view group.

4. The method according to claim 3, wherein associating the second spatial region of the volumetric video track with the corresponding view in the target view group comprises:
adding an association flag into a spatial region data box of a media file format data box of the target view group, the association flag being used for indicating whether the second spatial region is associated with a corresponding view in the target view group; and
adding a view identity into the spatial region data box during association, the view identity being used for indicating identity information of the view associated with the second spatial region.

5. The method according to claim 1, wherein transmitting the first spatial region information of the multiple view groups to the second computer device comprises:
generating a description file of the multi-view video data, the description file including a first spatial region field, wherein the first spatial region field is used for indicating the first spatial region information; and
transmitting the description file to the second computer device.

6. The method according to claim 5, wherein:
the description file is a description file of Dynamic Adaptive Streaming over HTTP (DASH); and
generating the description file of the multi-view video data comprises:
adding the first spatial region field into the description file of DASH of the multi-view video data.

7. The method according to claim 1, further comprising:
adding a second spatial region field into a spatial region data box of a media file format data box of the target view group, the second spatial region field being used for indicating the first spatial region information.

8. A computer device, comprising:
one or more processors; and
memory storing one or more programs, the one or more programs comprising instructions that, when executed by the one or more processors, cause the one or more processors to perform operations comprising:
acquiring multi-view video data, the multi-view video data including video data of multiple views;
performing view group division on the multi-view video data based on the multiple views to obtain multiple groups;
determining first spatial region information of the multiple view groups, the first spatial region information including identity information of the first spatial region, coordinate information of a reference point of the first spatial region, and a length of a bounding box of the first spatial region along a coordinate axis of a three-dimensional spatial region where the multiple view groups are located;
encapsulating the multi-view video data and the first spatial region information;
transmitting the first spatial region information to a second computer device;
receiving request information transmitted by the second computer device, wherein the request information identifies a media resource corresponding to a target view group of the multiple view groups according to the first spatial region information; and
transmitting the requested media resource corresponding to the target view group to the second computer device according to the request information.

9. The computer device according to claim 8, the operations further comprising:
acquiring second spatial region information of a volumetric video track corresponding to the target view group, the second spatial region information including information of a second spatial region where the volumetric video track is located, the second spatial region is a three-dimensional region; and
associating the second spatial region of the volumetric video track with a corresponding view in the target view group.

10. The computer device according to claim 9, wherein there is at least one second spatial region associated with a view in the target view group.

11. The computer device according to claim 10, wherein associating the second spatial region of the volumetric video track with the corresponding view in the target view group comprises:
adding an association flag into a spatial region data box of a media file format data box of the target view group, the association flag being used for indicating whether the second spatial region is associated with a corresponding view in the target view group; and
adding a view identity into the spatial region data box during association, the view identity being used for indicating identity information of the view associated with the second spatial region.

12. The computer device according to claim 2, wherein transmitting the first spatial region information of the multiple view groups to the second computer device comprises:
generating a description file of the multi-view video data, the description file including a first spatial region field, wherein the first spatial region field is used for indicating the first spatial region information; and
transmitting the description file to the second computer device.

13. The computer device according to claim 8, the operations further comprising:
adding a second spatial region field into a spatial region data box of a media file format data box of the target view group, the second spatial region field being used for indicating the first spatial region information.

14. A non-transitory computer-readable storage medium, storing one or more instructions, the one or more instructions, when executed by one or more processors of a computer device, cause the computer device to perform operations comprising:
- acquiring multi-view video data, the multi-view video data including video data of multiple views;
- performing view group division on the multi-view video data based on the multiple views to obtain multiple view groups;
- determining first spatial region information of the multiple view groups, the first spatial region information including identity information of the first spatial region, coordinate information of a reference point of the first spatial region, and a length of a bounding box of the first spatial region along a coordinate axis of a three-dimensional spatial region where the multiple view groups are located;
- encapsulating the multi-view video data and the first spatial region information;
- transmitting the first spatial region information to a second computer device;
- receiving request information transmitted by the second computer device, wherein the request information identifies a media resource corresponding to a target view group of the multiple view groups according to the first spatial region information; and
- transmitting the requested media resource corresponding to the target view group to the second computer device according to the request information.

15. The non-transitory computer-readable storage medium according to claim 14, the operations further comprising:
- acquiring second spatial region information of a volumetric video track corresponding to the target view group, the second spatial region information including information of a second spatial region where the volumetric video track is located, the second spatial region is a three-dimensional region; and
- associating the second spatial region of the volumetric video track with a corresponding view in the target view group.

16. The non-transitory computer-readable storage medium according to claim 14, wherein transmitting the first spatial region information of the multiple view groups to the second computer device comprises:
- generating a description file of the multi-view video data, the description file including a first spatial region field, wherein the first spatial region field is used for indicating the first spatial region information; and
- transmitting the description file to the second computer device.

17. The non-transitory computer-readable storage medium according to claim 14, the operations further comprising:
- adding a second spatial region field into a spatial region data box of a media file format data box of the target view group, the second spatial region field being used for indicating the first spatial region information.

* * * * *